(12) United States Patent
Park et al.

(10) Patent No.: US 7,174,102 B2
(45) Date of Patent: Feb. 6, 2007

(54) BI-DIRECTIONAL WAVELENGTH DIVISION MULTIPLEXING SELF-HEALING PASSIVE OPTICAL NETWORK

(75) Inventors: Sung-Bum Park, Suwon-si (KR); In-Kwon Kang, Seoul (KR); Seong-Taek Hwang, Pyeongtaek-si (KR); Jae-Hoon Lee, Seoul (KR)

(73) Assignee: Samsung Electronics Co, Ltd, Suwon-Si (KR)

( * ) Notice: Subject to any disclaimer, the term of this patent is extended or adjusted under 35 U.S.C. 154(b) by 0 days.

(21) Appl. No.: 10/918,279

(22) Filed: Aug. 13, 2004

(65) Prior Publication Data
US 2005/0147412 A1    Jul. 7, 2005

(30) Foreign Application Priority Data
Jan. 2, 2004    (KR) ............... 10-2004-0000115

(51) Int. Cl.
H04J 14/00    (2006.01)
(52) U.S. Cl. ............... 398/66; 398/79; 398/58; 398/72
(58) Field of Classification Search ............. 398/72, 398/79, 139, 58–64, 66, 67, 48; 385/24
See application file for complete search history.

(56) References Cited

U.S. PATENT DOCUMENTS

| | | | |
|---|---|---|---|
| 6,567,579 B2* | 5/2003 | Foltzer | 385/24 |
| 2001/0017722 A1* | 8/2001 | Takachio et al. | 359/124 |
| 2003/0076560 A1* | 4/2003 | Pratt et al. | 359/125 |
| 2004/0175177 A1* | 9/2004 | Lee et al. | 398/72 |
| 2004/0184806 A1* | 9/2004 | Lee et al. | 398/79 |

* cited by examiner

*Primary Examiner*—David C. Payne
(74) *Attorney, Agent, or Firm*—Cha & Reiter, LLC (57) ABSTRACT

Disclosed is a bi-directional wavelength division multiplexing self-healing passive optical network including: a central office for multiplexing and transmitting downstream optical signals to a first and a second main fiber; a remote node connected to the central office through the first and the second main fiber, for transmitting multiple pairs of the downstream optical signals, which are obtained by demultiplexing one inputted pair of the multiplexed downstream optical signals according to wavelengths, to corresponding pairs of distribution fibers; and a plurality of optical network units connected to the remote node through the multiple pairs of distribution fibers, each of the optical network units being selectively connected to one corresponding pair of the distribution fibers, for receiving a corresponding downstream optical signal from the selected distribution fiber.

16 Claims, 5 Drawing Sheets

BI-DIRECTIONAL WAVELENGTH DIVISION MULTIPLEXING SELF-HEALING PASSIVE OPTICAL NETWORK

CLAIM OF PRIORITY

This application claims priority, pursuant to 35 U.S.C. §119, to that patent application entitled "Bi-directional wavelength division multiplexing self-healing passive optical network," filed in the Korean Intellectual Property Office on Jan. 2, 2004 and assigned Serial No. 2004-115, the contents of which are hereby incorporated by reference.

BACKGROUND OF THE INVENTION

1. Field of the Invention

The present invention relates to an optical communication network, and more particularly to a passive optical network.

2. Description of the Related Art

A wavelength division multiplexing passive optical network (hereinafter, referred to as a WDM-PON) provides an ultra high-speed broadband communication service using specific wavelengths assigned to each subscriber unit. Therefore, a WDM-PON can ensure the secrecy of communication between subscriber units, can accommodate special communication services required from each subscriber unit, easily expand the channel capacity, and can easily increase the number of subscriber units by adding specific wavelengths to be assigned to new subscribers. Generally, a WDM-PON uses a double star structure in order to minimize the length of optical line. That is, a central office (CO) and a remote node (RN) installed at an area adjacent to optical network units (ONUs) are connected to each other through one feeder optical fiber. The remote node and each optical network unit are connected to each other through a separate distribution optical fiber. Multiplexed downstream optical signals are transmitted to the remote nodes through the feeder fiber and, the multiplexed downstream optical signals are de-multiplexed by a wavelength division multiplexer installed in the remote node. The de-multiplexed signals are transmitted to the optical network units through the distribution fibers. Similarly, upstream optical signals are outputted from the optical network units and transmitted to the remote node. The upstream optical signal are multiplexed by the wavelength division multiplexer and the multiplexed signal is transmitted to the central office.

In the WDM-PON, large amounts of data are transmitted at high speed through the wavelengths assigned to corresponding optical network units. Accordingly, when an unexpected abnormality (such as a malfunction or deterioration) of an upstream light source or a downstream light source, or an abnormality (such as a cut or deterioration) of a feeder fiber or distribution fiber occur, the transmitted data may be lost even if the abnormality occurs for a short time. Accordingly, such an abnormality must be quickly detected and instantly healed.

Recently, research into a wavelength injection light source, such as a wavelength locked Fabry-Perot laser and reflective semiconductor light source, capable of outputting an optical signal having the same wavelength as that of light injected to a light source for a WDM PON and performing a direct modulation has been pursued.

Hence, it is necessary to develop a WDM self-healing PON capable of quickly detecting an abnormality in feeder or distribution fibers and also healing the abnormality by itself.

SUMMARY OF THE INVENTION

Accordingly, an object of the present invention is to provide a bi-directional WDM self-healing PON capable of healing an abnormality of a main or feeder optical fiber or distribution optical fiber by itself in a PON having a double star structure.

In order to accomplish the aforementioned object, according to one aspect of the present, there is provided a bi-directional wavelength division multiplexing self-healing passive optical network comprising, of a central office for dividing power of generated and multiplexed downstream optical signals and transmitting the divided powers to a first and a second main fiber; a remote node connected to the central office through the first and the second main fiber for transmitting multiple pairs of the downstream optical signals, which are obtained by de-multiplexing one inputted pair of the multiplexed downstream optical signals according to wavelengths, to corresponding pairs of distribution fibers; and a plurality of optical network units connected to the remote node through the multiple pairs of distribution fibers, each of the optical network units being selectively connected to one corresponding pair of the distribution fibers, for receiving a corresponding downstream optical signal from the selected distribution fiber.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, an embodiment according to the present invention will be described with reference to the accompanying drawings. For purposes of clarity and simplicity, a detailed description of known functions and configurations incorporated herein will be omitted as it may make the subject matter of the present invention unclear.

Figure 1:
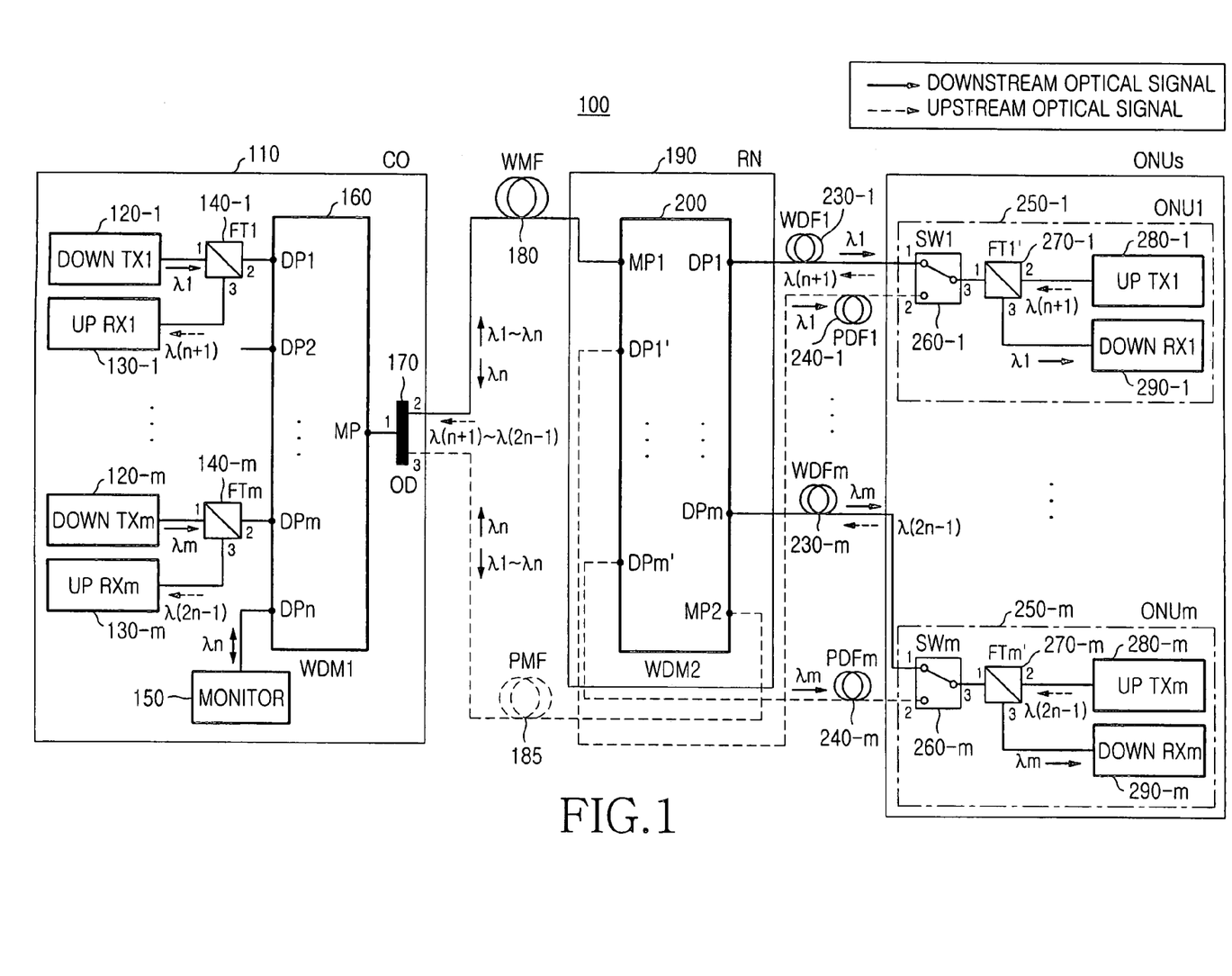
FIG. 1 is a view showing a construction of a bi-directional WDM self-healing PON according to a first embodiment of the present invention.

FIG. 1 is a view showing a construction of a bi-directional WDM self-healing PON according to a first embodiment of the present invention. The PON 100 includes a central office 110, a remote node 190, and a first to an $m^{th}$ optical network unit 250-1 to 250-$m$.

The central office 110 includes m-downstream transmitters (down TX) referred to as 120-1 to 120-$m$, m-upstream optical receivers (UP RX) referred to as 130-1 to 130-$m$, wavelength division multiplexing filter (hereinafter, referred to as a WDM filter) referred to as 140-1 to 140-$m$, a first wavelength division multiplexer (WDM) 160 having m+1 ports, referred to as DP1 to DPm and DPn, an optical distributor (OD) 170, and a monitor 150 connected to the $m^{th}+1$ port, i.e., $DP_n$ port.

Downstream transmitters 120-1 to 120-*m* output "m" downstream optical signal, each of a different wavelengths. Each of transmitter may include a laser diode that outputs light having a predetermined wavelength. The "m" upstream optical receivers 130-1 to 130-*m* receive a corresponding one of "m" upstream optical signals and each receiver may include a photo diode to detect the presence of the corresponding upstream wavelength.

Each of the "m" WDM filters 140-1 to 140-*m* includes a first, second and third port, which with regard to filter 140-1 are referred to as 140-1.1, 140-1.2 and 140-1.3. Herein, the first port is connected to a corresponding downstream transmitter, the second port is connected to a corresponding demultiplexing port (DP) of the first wavelength division multiplexer 160, and the third port is connected to a corresponding upstream optical receiver. Each of the "m" WDM filters 140-1 to 140-*m* outputs a corresponding downstream optical signal received at the first port to the second port, and outputs a corresponding upstream optical signal received at the second port to the third port.

The monitor 150 is connected to an $n^{th}$ de-multiplexing port of the first wavelength division multiplexer 160, and outputs an $n^{th}$ downstream optical signal, which is referred to as a monitoring optical signal, and further receives a return optical signal of the outputted $n^{th}$ downstream optical signal. The monitor 150 monitors whether an abnormality occurs at a working main fiber (WMF) 180 and a protection main fiber (PMF) 185 from the return optical signal. For instance, the monitor 150 includes a laser diode and a photo diode, or may include a typical optical time domain reflector (OTDR).

The first wavelength division multiplexer 160 includes a multiplexing port (MP) and a first to an $n^{th}$ de-multiplexing port. Herein, the multiplexing port is connected to the optical distributor 170, the first to the $m^{th}$ de-multiplexing port are respectively connected to the first to the $m^{th}$ WDM filter 140-1 to 140-*m* in a one-to-one fashion, and the $n^{th}$ de-multiplexing port is connected to the monitor 150. The first wavelength division multiplexer 160 wavelength division multiplexes a first to an $n^{th}$ downstream optical signal inputted to the first to the $n^{th}$ multiplexing ports and outputs the multiplexed signal to the multiplexing port. Further, the first wavelength division multiplexer 160 is operable to de-multiplex received multiplexed upstream optical signals inputted to the multiplexing port (MP) and output the de-multiplexed signals to the first to the $m^{th}$ de-multiplexing port, and the monitoring signal to the $n^{th}$ port. The first wavelength division multiplexer 160 may include an arrayed waveguide grating (AWG) having a predetermined free spectral range (FSR).

The optical distributor 170 includes a first to a third port, referred to as 170.1, 170.2, and 170.3. Herein, the first port is connected to the multiplexing port of the first wavelength division multiplexer 160, the second port is connected to the working main fiber 180, and the third port is connected to the protection main fiber 185. Further, the optical distributor 170 divides power of the multiplexed downstream optical signals, which is inputted to the first port, at a predetermined proportion (branching ratio), and outputs the divided powers to the second and the third port. Furthermore, the optical distributor 170 also is operable to provide a received upstream optical signal inputted from the second and the third ports to the first port. In one aspect, optical distributor may be an optical splitter, an optical coupler or a tapped optical fiber.

The remote node 190 includes a second wavelength division multiplexer 200. The second wavelength division multiplexer 200 includes one end having a first multiplexing port (MP1) and a first to an $m^{th}$ left de-multiplexing port DP1' to DPm' and other end having a second multiplexing port (MP2) and a first to an $m^{th}$ right de-multiplexing port DP1 to DPm. The first multiplexing port (MP1) is connected to the second port of the optical distributor 170 through the working main fiber 180, and the second multiplexing port (MP2) is connected to the third port of the optical distributor 170 through the protection main fiber 185. The first to the $m^{th}$ right de-multiplexing port DP1 to DPm and the first to the $m^{th}$ left de-multiplexing port DP1' to DPm' are connected to the first to the $m^{th}$ optical network unit 250-1 to 250-*m*. The second wavelength division multiplexer 200 wavelength division de-multiplexes the multiplexed downstream optical signals inputted to the first multiplexing port and outputs the de-multiplexed signals to the first to the $m^{th}$ right de-multiplexing port DP1 to DPm. The de-multiplexed $n^{th}$ downstream optical signal is a first return optical signal and is outputted to the second multiplexing port. The second wavelength division multiplexer 200 wavelength division de-multiplexes the multiplexed downstream optical signals inputted to the second multiplexing port and outputs the de-multiplexed signals to the first to the $m^{th}$ left de-multiplexing port DP1' to DPm'. The de-multiplexed $n^{th}$ downstream optical signal is a second return optical signal and is outputted to the first multiplexing port. The first return optical signal outputted to the second multiplexing port of the second wavelength division multiplexer 200 passes through the protection main fiber 185 and the optical distributor 170 and is inputted the multiplexing port of the first wavelength division multiplexer 160. The first wavelength division multiplexer 160 outputs the inputted first return optical signal to the $n^{th}$ de-multiplexing port DPn. The second return optical signal outputted to the first multiplexing port of the second wavelength division multiplexer 200 passes through the working main fiber 180 and the optical distributor 170 and is inputted the multiplexing port of the first wavelength division multiplexer 160. The first wavelength division multiplexer 160 outputs the inputted second return optical signal to the $n^{th}$ de-multiplexing port DPn. When a branching ratio of the optical distributor 170 is set to be unbalanced, the first and the second return optical signal are monitored on the basis of the branching ratio of the optical distributor 170, so that an abnormality that occurs in the working main fiber 180 or the protection main fiber 185 can be determined, i.e., first and second main fibers.

The "m" optical network units 250-1 to 250-*m* each are connected to the second wavelength division multiplexer 200 through working distribution fibers (WDFs) 230-1 to 230-*m* and protection distribution fibers (PDFs) 240-1 to 240-*m*. The $m^{th}$ optical network unit 250-*m* includes an $m^{th}$ switch 260-*m*, an $m^{th}$ WDM filter 270-*m*', an $m^{th}$ upstream transmitter 280-*m*, and an $m^{th}$ downstream optical receiver 290-*m*. Since the first to the $m^{th}$ optical network units 250-1 to 250-*m* have the same construction, the first optical network unit 250-1 will be representatively described hereinafter.

The first optical network unit 250-1 includes a first switch 260-1, a first WDM filter 270-1', a first upstream transmitter 280-1, and a first downstream optical receiver 290-1.

The first switch 260-1 includes a first to a third port referred to as 260-1.1, 260-1.2 and 260-1.3. First port 260-1.1 is connected to the first right de-multiplexing port DP1 of the second wavelength division multiplexer 200 through the first working distribution fiber 230-1, the second port 260-1.2 is connected to the first left de-multiplexing port DP1' of the second wavelength division multiplexer 200, and the third port 260-1.3 is selectively connected to one of the first 260-1.1 and the second port 260-1.2. When an abnormality occurs at the first working distribution fiber 230-1, the second port 260-1.2 is connected to the third port 260-1.3. Similarly, when an abnormality occurs at the first protection distribution fiber 240-1, the first port 260-1.1 is connected to the third port 260-1.3. An abnormality occurring at the first working distribution fiber 230-1 or the first protection distribution fiber 240-1 can be determined according to the state of the first downstream optical signal inputted to the first downstream optical receiver 290-1.

The first WDM filter 270-1' includes a first to a third port, referred to as 270-1'.1, 270.1'.2 and 270.1'.3 First port 270-1'.1 is connected to third port 270-1'.3, the second port 270-1'.2 is connected to the first upstream transmitter 280-1, and the third port 270-1'.3 is connected to the first downstream optical receiver 290-1.

The first upstream transmitter 280-1 outputs the first upstream optical signal and may include a laser diode that outputs light having a predetermined wavelength. The first downstream optical receiver 290-1 receives the first downstream optical signal and may include a photo diode.

Figure 2:
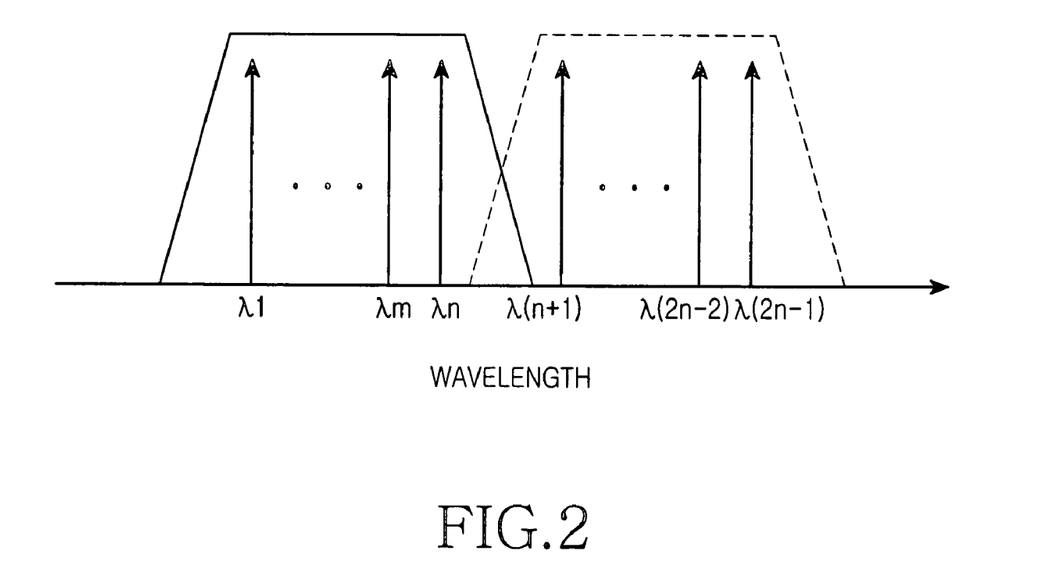
FIG. 2 is a view showing spectrums of multiplexed upstream optical signals and downstream optical signals which progress into the PON shown in FIG. 1.

FIG. 2 is a view showing spectrums of multiplexed upstream optical signals and downstream optical signals which progress into the PON. As shown wavelength ranges of the multiplexed upstream optical signals and downstream optical signals do not overlap. The first wavelength division multiplexer 160 includes a free spectral range coinciding with an entire wavelength range of the multiplexed upstream optical signals, so that it can process not only the multiplexed upstream optical signals but also the multiplexed downstream optical signals by means of the periodicity of the free spectral range.

Figure 3:
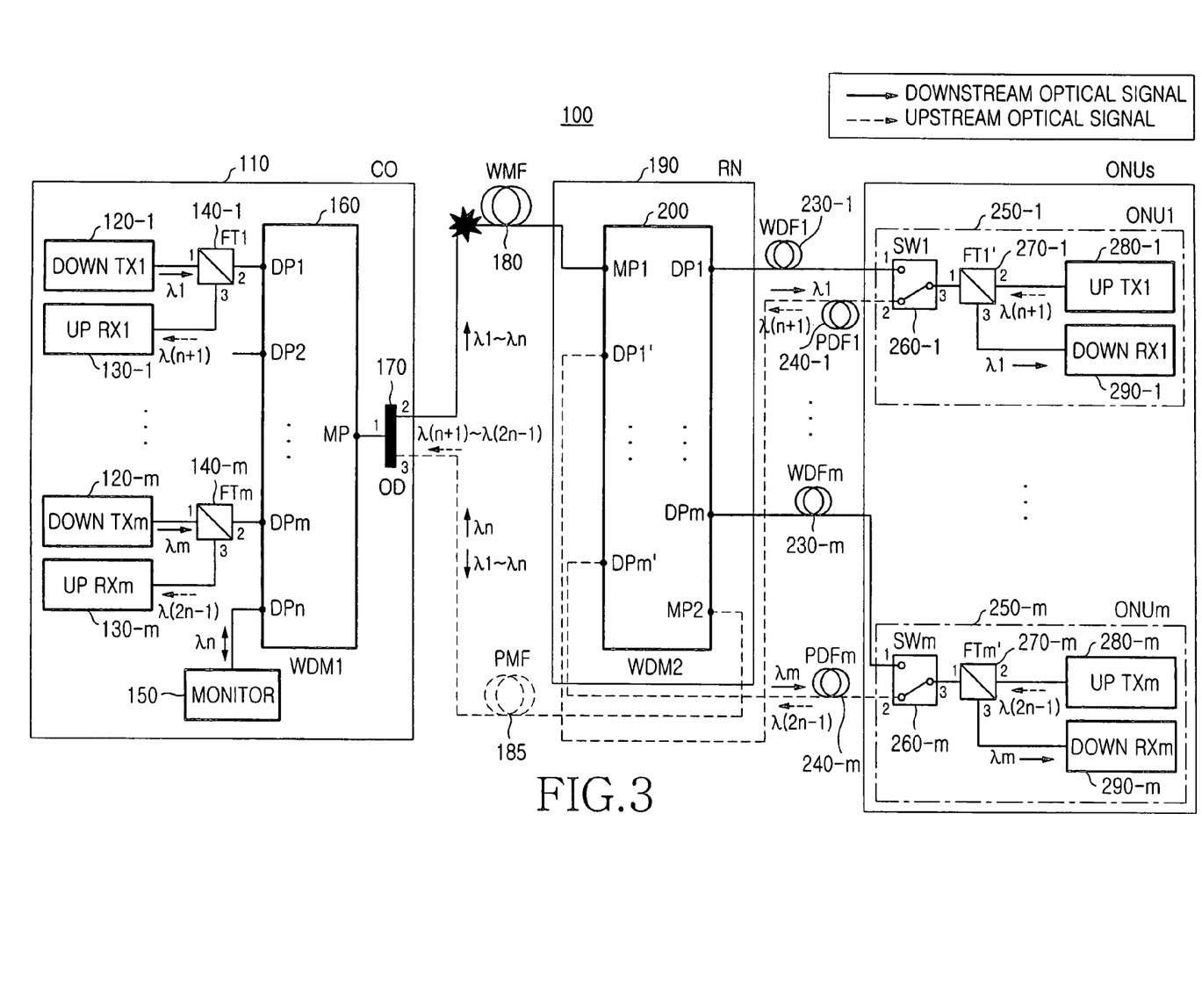
FIG. 3 is a block diagram illustrating a self-healing process when an abnormality has occurred at the working main fiber in the PON shown in FIG. 1.

FIG. 3 is a block diagram illustrating a self-healing process when an abnormality occurs in the working main fiber in the PON shown in FIG. 1. The central office 110 determines that the abnormality has occurred at the working main fiber 180 by the monitor 150. That is, when the abnormality has occurred at the working main fiber 180, the first and the second return optical signal are not inputted to the monitor 150. The monitor 150 determines that the abnormality has occurred at the working main fiber 180 from existence or absence of inputs of the return optical signals.

The first to the $m^{th}$ optical network unit 250-1 to 250-$m$ each determine that a corresponding downstream optical signal is not inputted to a corresponding downstream optical receiver, and connects a second port of a corresponding switch to a third port of the corresponding switch. Therefore, even when the abnormality has occurred at the working main fiber 180, the first to the $m^{th}$ optical network unit 250-1 to 250-$m$ normally receive the downstream optical signals.

Figure 4:
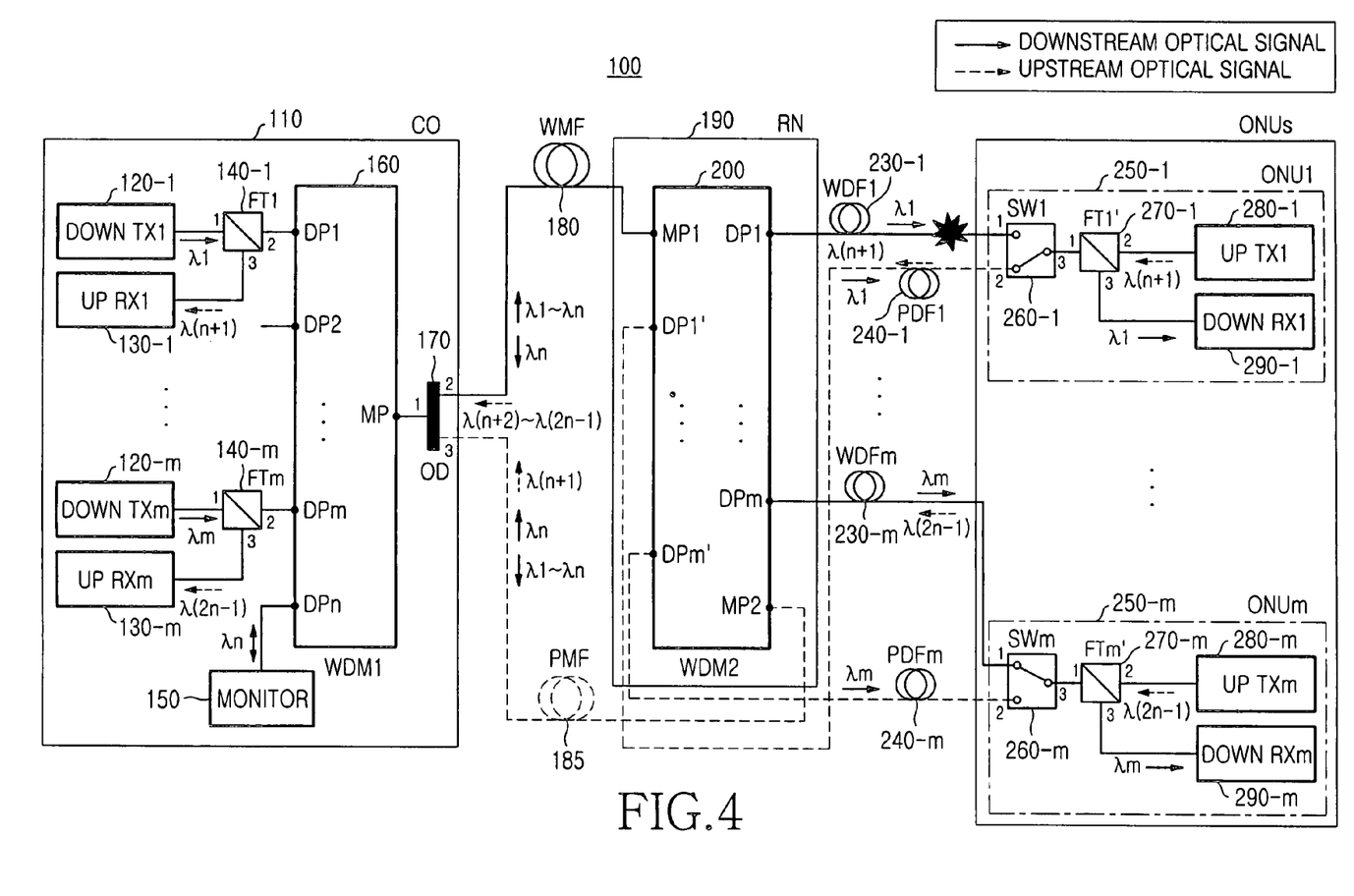
FIG. 4 is a block diagram illustrating a self-healing process when an abnormality has occurred at the working distribution fiber in the PON shown in FIG. 1.

FIG. 4 is a block diagram illustrating a self-healing process when an abnormality has occurred at the working distribution fiber in the PON shown in FIG. 1. The first optical network unit 250-1 determines that the first downstream optical signal is not inputted to the first downstream optical receiver 290-1, and connects the second port 260-1.1 of the first switch 260-1 to the third port 260-1.3 of the first switch 260-1. The other optical network units 250-2 to 250-$m$ do not perform such a switching operation. Therefore, even when the abnormality has occurred at the first working distribution fiber 230-1, the first to the $m^{th}$ optical network unit 250-1 to 250-$m$ normally receive the downstream optical signals.

Figure 5:
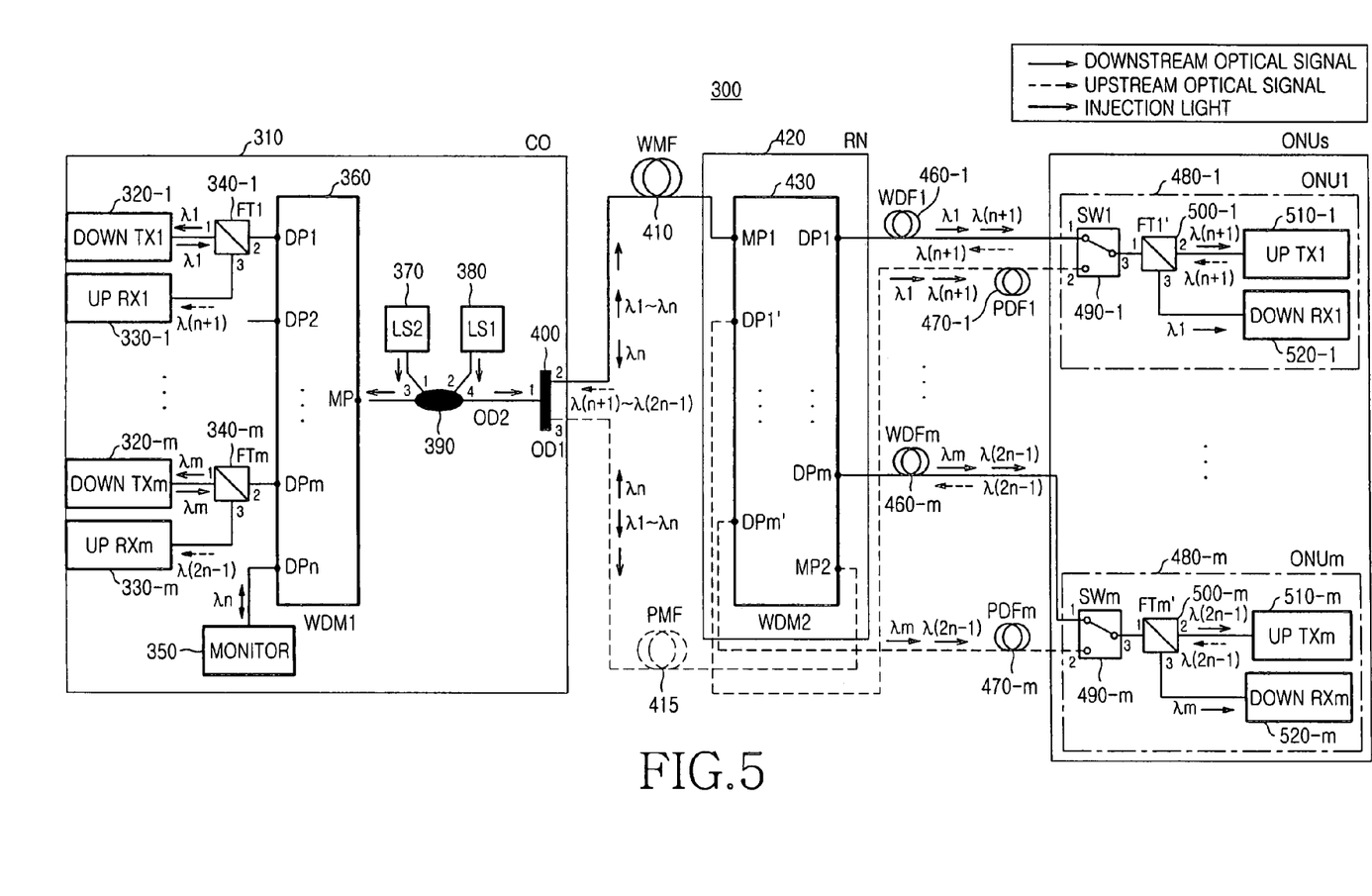
FIG. 5 is a view showing a construction of a bi-directional WDM self-healing PON according to a second embodiment of the present invention.

FIG. 5 is a view showing a construction of a bi-directional WDM self-healing PON according to a second embodiment of the present invention. The PON 300 includes a central office 310, a remote node 420, and a first to an $m^{th}$ optical network unit 480-1 to 480-$m$.

The central office 310 includes a first to an $m^{th}$ downstream transmitter 320-1 to 320-$m$, a first to an $m^{th}$ upstream optical receiver 330-1 to 330-$m$, a first wavelength division multiplexer 360, a first and a second optical distributor 390 and 400, a first to an $m^{th}$ WDM filter 340-1 to 340-$m$, a first and a second broadband light source 370 and 380, and a monitor 350.

The first broadband light source 380 outputs a first injection light over a wide wavelength range and the second broadband light source 370 outputs a second injection light over a wide wavelength range.

The first optical distributor 390 includes a first to a fourth port referred to as 390.1–390.4. Herein, the first port 390.1 is connected to the second broadband light source 370, the second port 390.2 is connected to the first broadband light source 380, the third port 390.3 is connected to a multiplexing port of the wavelength division multiplexer 360, and the fourth port 390.4 is connected to the second optical distributor 400. Further, the first optical distributor 390 outputs the first injection light launched into the second port 390.2 to the third port 390.3 thereof and outputs the second injection light launched into the first port 390.1 to the fourth port 390.4 thereof. Furthermore, the first optical distributor 390 outputs multiplexed downstream optical signals launched into the third port to the fourth port thereof and outputs multiplexed upstream optical signals or a return optical signal launched into the fourth port to the third port thereof.

The wavelength division multiplexer 360 includes a multiplexing port (MP) and an first to an $n^{th}$ de-multiplexing port. Herein, the multiplexing port is connected to the third port 390.3 of the first optical distributor 390. The first to the $m^{th}$ de-multiplexing port are respectively connected to the first to the $m^{th}$ WDM filter 340-1 to 340-$m$ in a one-to-one fashion, and the $n^{th}$ de-multiplexing port is connected to the monitor 350. Further, the wavelength division multiplexer 360 wavelength de-multiplexes the multiplexed upstream optical signals inputted to the multiplexing port to output the de-multiplexed optical signals to the first to the $m^{th}$ de-multiplexing port, and outputs the return optical signal inputted to the multiplexing port to the $n^{th}$ de-multiplexing port. Further, the wavelength division multiplexer 360 spectrum-slices the first injection light inputted to the multiplexing port to output the spectrum-sliced light to the first to the $m^{th}$ de-multiplexing port. Furthermore, the wavelength division multiplexer 360 wavelength division multiplexes a first to an $n^{th}$ downstream optical signal inputted to the first to the $n^{th}$ de-multiplexing port to output the multiplexed signal to the multiplexing port.

The first to the $m^{th}$ downstream transmitter 320-1 to 320-$m$ each are wavelength-locked by a corresponding wavelength component of the inputted first injection light to output a corresponding downstream optical signal. Further, the first to the $m^{th}$ downstream transmitter 320-1 to 320-$m$ output the first to the $m^{th}$ downstream optical signal having different wavelengths.

The first to the $m^{th}$ upstream optical receiver 330-1 to 330-$m$ receive a first to an $m^{th}$ upstream optical signal.

The first to the $m^{th}$ WDM filter 340-1 to 340-$m$ each includes a first to a third port. Herein, the first port is connected to a corresponding downstream transmitter, the second port is connected to a corresponding de-multiplexing port of the wavelength division multiplexer 360, and the third port is connected to a corresponding upstream optical receiver. Further, the first to the $m^{th}$ WDM filter 340-1 to 340-$m$ each output a corresponding downstream optical signal inputted to the first port to the second port, output the corresponding upstream optical signal inputted to the second port to the third port, and output the corresponding wavelength component of the first injection light inputted to the second port to the first port.

The monitor 350 is connected to the $n^{th}$ de-multiplexing port of the wavelength division multiplexer 360, outputs an $n^{th}$ optical signal, which is a monitoring signal, and receives the return optical signal. Further, the monitor 350 monitors whether an abnormality occurs at a working main fiber 410 and a protection main fiber 415 from the return optical signal.

The second optical distributor 400 includes a first to a third port, referred to as 400.1, 400.2, and 400.3. Herein, the first port 400.1 is connected to the fourth port of the first optical distributor 390, the second port 400.2 is connected to the working main fiber 410, and the third port 400.3 is connected to the protection main fiber 415. Further, the second optical distributor 400 divides power of the multiplexed downstream optical signals and the second injection light, which are inputted to the first port, according to a predetermined proportion, and outputs the divided powers to the second and the third port. Furthermore, the second optical distributor 400 outputs the upstream optical signals and the return optical signal, which are inputted to the second and the third port, to the first port.

The remote node 420 includes a second wavelength division multiplexer 430.

The second wavelength division multiplexer 430 includes one end having a first multiplexing port and a first to an $m^{th}$ left demultiplexing port DP1' to DPm' and other end having a second multiplexing port and a first to an $m^{th}$ right demultiplexing port DP1 to DPm. The first multiplexing port is connected to the second port of the second optical distributor 400 through the working main fiber 410, and the second multiplexing port is connected to the third port of the second optical distributor 400 through the protection main fiber 415. The first to the $m^{th}$ right de-multiplexing port DP1 to DPm and the first to the $m^{th}$ left de-multiplexing port DP1' to DPm' are connected to the first to the $m^{th}$ optical network unit 480-1 to 480-$m$. The second wavelength division multiplexer 430 wavelength division de-multiplexes the multiplexed downstream optical signals inputted to the first multiplexing port, and outputs the de-multiplexed signals to the first to the $m^{th}$ right de-multiplexing port DP1 to DPm. Herein, the de-multiplexed $n^{th}$ downstream optical signal is a first return optical signal and is outputted to the second multiplexing port. The second wavelength division multiplexer 430 wavelength division de-multiplexes the multiplexed downstream optical signals inputted to the second multiplexing port, and outputs the de-multiplexed signals to the first to the $m^{th}$ left de-multiplexing port DP1' to DPm'. Herein, the de-multiplexed $n^{th}$ downstream optical signal is a second return optical signal and is outputted to the first multiplexing port. The second wavelength division multiplexer 430 spectrum-slices the second injection light inputted to the first multiplexing port to output the spectrum-sliced light to the first to the $m^{th}$ right de-multiplexing port DP1 to DPm. The second wavelength division multiplexer 430 spectrum-slices the second injection light inputted to the second multiplexing port to output the spectrum-sliced light to the first to the $m^{th}$ left de-multiplexing port DP1' to DPm'. The first return optical signal outputted to the second multiplexing port of the second wavelength division multiplexer 430 passes through the protection main fiber 415, the second optical distributor 400, and the first optical distributor 390, and is inputted the multiplexing port of the first wavelength division multiplexer 360. The first wavelength division multiplexer 360 outputs the inputted first return optical signal to the $n^{th}$ right demultiplexing port DPn. The second return optical signal outputted to the first multiplexing port of the second wavelength division multiplexer 430 passes through the working main fiber 410, the second optical distributor 400, and the first optical distributor 390, and is inputted the multiplexing port of the first wavelength division multiplexer 360. The first wavelength division multiplexer 360 outputs the inputted second return optical signal to the $n^{th}$ right de-multiplexing port DPn. When a branching ratio of the second optical distributor 400 is set to be unbalanced, the first and the second return optical signal are monitored on the basis of the branching ratio of the second optical distributor 400, so that whether or not an abnormality occurs at the working main fiber 410 or the protection main fiber 415 can be determined.

The first to the $m^{th}$ optical network unit 480-1 to 480-$m$ each are connected to the second wavelength division multiplexer 430 through working distribution fibers (WDFs) 460-1 to 460-$m$ and protection distribution fibers (PDFs) 470-1 to 470-$m$. The $m^{th}$ optical network unit 480-$m$ includes an $m^{th}$ switch 490-$m$, an $m^{th}$ WDM filter 500-$m'$, an $m^{th}$ upstream transmitter 510-$m$, and an $m^{th}$ downstream optical receiver 520-$m$. Since the first to the $n^{th}$ optical network unit 480-1 to 480-$m$ have the same construction, the first optical network unit 480-1 will be representatively described hereinafter.

The first optical network unit 480-1 includes a first switch 490-1, a first WDM filter 500-1', a first upstream transmitter 510-1, and a first downstream optical receiver 520-1.

The first switch 490-1 includes a first to a third port, referred to herein as 490-1.1, 490-1.2 and 490-1.3. Herein, the first port 490-1.1 is connected to the first right de-multiplexing port DP1 of the second wavelength division multiplexer 430 through the first working distribution fiber 460-1, the second port 490-1.2 is connected to the first left demultiplexing port DP1' of the second wavelength division multiplexer 430, and the third port 490-1.3 of the first switch 490-1 is selectively connected to one of the first and the second port. When an abnormality occurs at the first working distribution fiber 460-1, the second port of the first switch 490-1 is connected to the third port of the first switch 490-1. In contrast, when an abnormality occurs at the first protection distribution fiber 470-1, the first port of the first switch 490-1 is connected to the third port of the first switch 490-1. When abnormality occurs at the first working distribution fiber 460-1 or the first protection distribution fiber 470-1, the abnormality can be determined according to the state of the first downstream optical signal inputted to the first downstream optical receiver 520-1.

The first WDM filter 500-1' includes a first to a third port. Herein, the first port is connected to the third port of the first switch 490-1, the second port is connected to the first upstream transmitter 510-1, and the third port is connected to the first downstream optical receiver 520-1. Further, the first WDM filter 500-1' outputs a corresponding wavelength component of the second injection light inputted to the first port to the second port, outputs the first upstream optical signal inputted to the second port to the first port, and outputs the first downstream optical signal inputted to the first port to the third port.

The first upstream transmitter 510-1 is wavelength-locked by the corresponding wavelength component of the inputted second injection light to output the first upstream optical signal.

The first downstream optical receiver 520-1 receives the first downstream optical signal.

In the present invention as described above, a bi-directional wavelength division multiplexing self-healing passive optical network, which includes a central office, a remote node connected to the central office, and a plurality of optical network units connected to the remote node, has the following advantages:

the central office is connected to the remote node through a first and a second main fiber, power of multiplexed downstream optical signals generated in the central office is divided, and the divided powers are transmitted to the remote node through the first and the second main fiber, so that a communication can be performed normally through one fiber even if an abnormality occurs at another fiber;

the optical network units are connected to the remote node through multiple pairs of distribution fibers, and each of the optical network units is selectively connected to one from among a corresponding pair of distribution fibers, so that a communication can be performed normally through one distribution fiber even if an abnormality occurs at another distribution fiber;

the bi-directional wavelength division multiplexing self-healing passive optical network can incorporate both of the aforementioned two advantages by means of the first and the second main fiber and the multiple pairs of distribution fibers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bi-directional wavelength division multiplexing self-healing passive optical network comprising:
   a central office for dividing powers of generated and multiplexed downstream optical signals in a known ratio and transmitting the divided powers to both a first and a second main fibers;
   a downstream transmitter, coupled to the central office, for generating a plurality of downstream optical signals;
   a first wavelength division multiplexer, coupled to the central office, for wavelength division multiplexing the downstream optical signals to generate the multiplexed downstream optical signals;
   a first optical distributor, coupled to the central office, for dividing power of the multiplexed downstream optical signals to transmit the divided powers to the first and the second main fiber;
   a monitor, coupled to the central office, for generating a monitoring optical signal that is output to a first wavelength division multiplexer, and for recognizing whether abnormality occurs at the first and a second main fiber from a state of a return optical signal inputted from the first wavelength division multiplexer;
   a remote node connected to the central office through the first and the second main fiber, for transmitting multiple pairs of the downstream optical signals, which are obtained by demultiplexing one inputted pair of the multiplexed downstream optical signals according to wavelengths, to corresponding pairs of distribution fibers; and
   a plurality of optical network units connected to the remote node through the multiple pairs of distribution fibers, each of the optical network units being selectively connected to one corresponding pair of the distribution fibers by a switch, for receiving a corresponding downstream optical signal from the selected distribution fiber.

2. The bi-directional wavelength division multiplexing self-healing passive optical network as claimed in claim 1, wherein each of the optical network units comprises:
   a switch having a first, a second and a third port, wherein the first and the second ports are connected to a corresponding pair of distribution fibers, for connecting the third port to a selected one of the corresponding pairs of distribution fibers; and
   an downstream optical receiver for receiving a corresponding downstream optical signal outputted from the switch.

3. The bi-directional wavelength division multiplexing self-healing passive optical network as claimed in claim 2, wherein each of the optical network units further comprising:
   an upstream transmitter for generating a corresponding upstream optical signal.

4. The bi-directional wavelength division multiplexing self-healing passive optical network as claimed in claim 1, the central office further comprising:
   upstream optical receivers for receiving a plurality of upstream optical signals outputted from the first wavelength division multiplexer.

5. The bi-directional wavelength division multiplexing self-healing passive optical network as claimed in claim 1, the central office further comprising:
   a first broadband light source for generating a first injection light over a wide wavelength range; and
   a second optical distributor disposed between the first wavelength division multiplexer and the first optical distributor, for providing the first wavelength division multiplexer with the first injection light.

6. The bi-directional wavelength division multiplexing self-healing passive optical network as claimed in claim 5, the central office further comprising:
   a second broadband light source for generating a second injection light over a wide wavelength range, wherein the second optical distributor provides the first optical distributor with the second injection light.

7. A bi-directional wavelength division multiplexing self-healing passive optical network containing at least one central office terminal connected to at least one remote node through a first and a second main fiber, the central office comprising:
   a downstream transmitter for generating a plurality of downstream optical signals;
   a first wavelength division multiplexer for wavelength division multiplexing the downstream optical signals to generate multiplexed downstream optical signals;
   a first optical distributor for dividing power of the multiplexed downstream optical signals in a known branch ratio to transmit the divided powers to the first and the second main fiber; and
   a monitor for generating a monitoring optical signal that is output to the first wavelength division multiplexer, and for recognizing whether abnormality occurs at the first and the second main fiber from a state of a return optical signal inputted from the first wavelength division multiplexer.

8. The network as claimed in claim 7, wherein the monitor determines abnormality based on the branch ratio between the first and second fiber.

9. The network as claimed in claim 7, the central office further comprising:
a first broadband light source for generating a first injection light over a wide wavelength range;
a second optical distributor disposed between the first wavelength division multiplexer and the first optical distributor, for providing the first wavelength division multiplexer with the first injection light; and
a second broadband light source for generating a second injection light over a wide wavelength range, wherein the second optical distributor provides the first optical distributor with the second injection light.

10. The network as claimed in claim 7, the remote unit comprising:
a first and second multiple-input port connected to the first and second main fibers, respectively;
a plurality of distribution fibers, arranged in pairs, wherein each pair of distribution fibers is associated with a network unit; and
a multiplexer/demultiplexer for de-multiplexing optical signals received on a selected one of the first and second fiber and outputting the de-multiplexed optical signals on corresponding distribution fiber pairs and multiplexing optical signals received on a selected one of the distribution fiber pair and outputting the multiplexed signal to a selected one of the first and second main fibers.

11. The network as claimed in claim 10, further comprising:
a plurality of optical network units, each unit connected to a selected pair of distribution fibers, the optical network units comprising:
a switch having a first, second and third bi-directional ports, wherein the distribution fiber pair elements are connected to corresponding first and second ports and selectively coupled to the third port; and
a downstream receiver for receiving the downstream optical signal on the corresponding distribution fiber pair.

12. The network as claimed in claim 11, the network unit further comprising:
a filter having a first, a second and a third port, wherein the first port is connected to the third port of the switch and the third port is connected to the downstream receiver; and
an upstream transmitter connected to the filter second port, wherein the filter is operable to separate the downstream optical signals and upstream optical signals generated by the upstream transmitter.

13. A bi-directional wavelength division multiplexing self-healing passive optical network comprising:
a central office;
a downstream transmitter, coupled to the central office, for generating a plurality of downstream optical signals;
a first wavelength division multiplexer, coupled to the central office, for wavelength division multiplexing the downstream optical signals to generate the multiplexed downstream optical signals;
a first optical distributor, coupled to the central office, for dividing power of the multiplexed downstream optical signals to transmit the divided powers to the first and the second main fiber;
a monitor, coupled to the central office, for generating a monitoring optical signal that is output to a first wavelength division multiplexer, and for recognizing whether abnormality occurs at the first and a second main fiber from a state of a return optical signal inputted from the first wavelength division multiplexer;
a remote node connected to the central office through a first and second main fiber; and
a plurality of optical network units connected to the remote node through multiple pairs of distribution fibers pairs, each of the optical network units being selectively connected to one element of a corresponding distribution fiber pair by a switch, for receiving a corresponding downstream optical signal from the selected distribution fiber.

14. The network as claimed in claim 13, wherein each of the optical network units comprises:
a switch having a first, a second and a third port, wherein the first and the second ports are connected to a corresponding pair of distribution fibers, for connecting the third port to a selected one of the corresponding pairs of distribution fibers; and
and an upstream transmitter generating upstream signal outputted to the switch.

15. The network as claimed in claim 14, the network unit further comprising:
a filter connected to the switch and the upstream transmitter; and
a downstream receiver for receiving downstream signals, wherein the filter is operable to isolate the upstream and downstream signals.

16. The network as claimed in claim 15, wherein the upstream signals are in a first frequency band and the downstream signals are in a second frequency band and the first and second frequency bands are not overlapping.

* * * * *